(12) United States Patent
Gerstner

(10) Patent No.: US 11,525,501 B1
(45) Date of Patent: Dec. 13, 2022

(54) PASS THROUGH DIFFERENTIAL

(71) Applicant: Steven R. Gerstner, Winter Haven, FL (US)

(72) Inventor: Steven R. Gerstner, Winter Haven, FL (US)

( * ) Notice: Subject to any disclaimer, the term of this patent is extended or adjusted under 35 U.S.C. 154(b) by 0 days.

(21) Appl. No.: 17/553,489

(22) Filed: Dec. 16, 2021

(51) Int. Cl.
F16H 48/42 (2012.01)
F16H 48/05 (2012.01)

(52) U.S. Cl.
CPC ............. *F16H 48/42* (2013.01); *F16H 48/05* (2013.01); *F16H 2048/423* (2013.01)

(58) Field of Classification Search
CPC .... F16H 48/05; F16H 48/42; F16H 2048/423; B60K 17/36
See application file for complete search history.

(56) References Cited

U.S. PATENT DOCUMENTS

| | | | | |
|---|---|---|---|---|
| 3,112,965 | A * | 12/1963 | Popiel | F16H 57/022 384/585 |
| 10,357,997 | B1* | 7/2019 | Hayes | B60K 17/36 |
| 2004/0089484 | A1* | 5/2004 | Oates | B62D 61/10 180/24.09 |
| 2006/0272866 | A1* | 12/2006 | Ziech | B60K 17/36 180/24.1 |
| 2021/0396302 | A1* | 12/2021 | Heath | F16D 41/088 |

FOREIGN PATENT DOCUMENTS

JP H08210471 A * 8/1996

* cited by examiner

*Primary Examiner* — Victor L MacArthur
(74) *Attorney, Agent, or Firm* — Cygnet IP Law, P.A.; Stephen W. Aycock, II

(57) ABSTRACT

Pass-through differentials are described.

9 Claims, 14 Drawing Sheets

PASS THROUGH DIFFERENTIAL

FIELD

Some implementations relate to vehicle differentials, and, more particularly, to front tandem differentials, or pass-through differentials, configured to convert a 4×4 vehicle to a 6×6 vehicle, for example.

BACKGROUND

A 4×4 vehicle is commonly understood to include a vehicle that has four wheels and four live axles such that each wheel is driven by a corresponding axle. At the rear of most 4×4 vehicles is a differential that transfers the driveshaft rotation along one axis to rotation of each of two axles along a perpendicular axis.

To convert a 4×4 vehicle into a 6×6 vehicle having six wheels driven by six corresponding axles, a second differential and set of axles is added to the rear of the vehicle creating a tandem rear axle. Thus, the vehicle has a front axle set with two wheels driven by the front axles, and tandem axle and differential sets in the rear with two wheels coupled to a front axle/differential set and two wheels coupled to a rear axle/differential set. The front axle of the tandem rear axles includes a differential that takes in rotation from the main driveshaft of the vehicle and sends power to two wheels coupled to the differential and also sends power to a differential of the rear tandem axle via an axle that connects the front differential of the tandem axle pair to the rear differential of the tandem axle pair. This type of differential is sometimes referred to as a "pass through" differential because the driveshaft rotation is passed through the differential from an input side to an output side and on to the rear differential of the tandem pair, where the rear tandem differential is similar to a standard differential and axle set.

Due to the requirements often placed on 6×6 vehicles, such as large engines and high horsepower engines, a front tandem differential may benefit from components that have increased strength and durability. However, increasing the size of one or more components of a differential may have an effect on the differential of requiring other components to be resized and/or eliminated or modified.

Embodiments were conceived in light of the above-mentioned problems and limitations, among other things. The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

SUMMARY

Some implementations can include a differential comprising an input shaft having an input spline section and a threaded input connection, a pinion coupled to the input shaft, the pinion having a splined recess, and one or more pinion bearings disposed on the input shaft and configured to support the input shaft and the pinion. The differential can also include an output shaft having a pinion spline section configured to mate with the splined recess of the pinion, the output shaft having an output spline section and a threaded output connection, an output boss having an aperture through which the output shaft extends through, and an output bearing disposed around the output shaft and within the output boss. The differential can further include a snap ring configured to fit over the output shaft to hold the output bearing in place, a seal configured to seal an outermost opening of the output boss, a flange, and a nut to couple the flange to the output shaft.

In some implementations, the output bearing is a single row bearing. In some implementations, the output bearing is a double row bearing.

In some implementations, the input shaft and the output shaft are supported only by the pinion bearing and the output bearing. In some implementations, the input spline section includes 28 splines, and the output spline section includes 31 splines. In some implementations, the input spline section includes 32 splines, and the output spline section includes 32 splines. In some implementations, the input spline section includes 35 splines, and the output spline section includes 32 splines.

Some implementations can include a differential comprising an input shaft having an input spline section and a threaded input connection, a pinion coupled to the input shaft, the pinion having a splined recess, one or more pinion bearings disposed on the input shaft and configured to support the input shaft and the pinion, and an output shaft having a pinion spline section configured to mate with the splined recess of the pinion, the output shaft having an output spline section and a threaded output connection, wherein the pinion spline section includes 32 splines and the output spline section includes 32 splines. The differential can also include an output boss having an aperture through which the output shaft extends through, an output bearing disposed around the output shaft and within the output boss, a snap ring configured to fit over the output shaft to hold the output bearing in place, a seal configured to seal an outermost opening of the output boss, a flange, and a nut to couple the flange to the output shaft.

In some implementations, the output bearing is a single row bearing. In some implementations, the output bearing is a double row bearing. In some implementations, the input shaft and the output shaft are supported only by the pinion bearing and the output bearing.

Some implementations can include a differential comprising a single shaft having an input spline section, a threaded input connection, a pinion spline section, an output spline section, and an output threaded connection, a pinion having an aperture with splines formed on an interior of the aperture, wherein the pinion is configured to slide onto the single shaft and engage the pinion spline section with the aperture with interior splines. The differential can also include one or more pinion bearings disposed on the single shaft and configured to support the single shaft and the pinion, an output boss having an aperture through which the single shaft extends through, and an output bearing disposed around the single shaft and within the output boss.

The differential can further include a snap ring configured to fit over the single shaft to hold the output bearing in place, a seal configured to seal an outermost opening of the output boss, a flange, and a nut to couple the flange to the single shaft.

In some implementations, the output bearing is a single row bearing. In some implementations, the output bearing is a double row bearing. In some implementations, the single shaft is supported only by the pinion bearing and the output bearing. In some implementations, the input spline section includes 28 splines, and the output spline section includes 31 splines. In some implementations, the input spline section includes 32 splines, and the output spline section includes 32 splines. In some implementations, the input spline section includes 35 splines, and the output spline section includes 32 splines.

DETAILED DESCRIPTION

Figure 1:
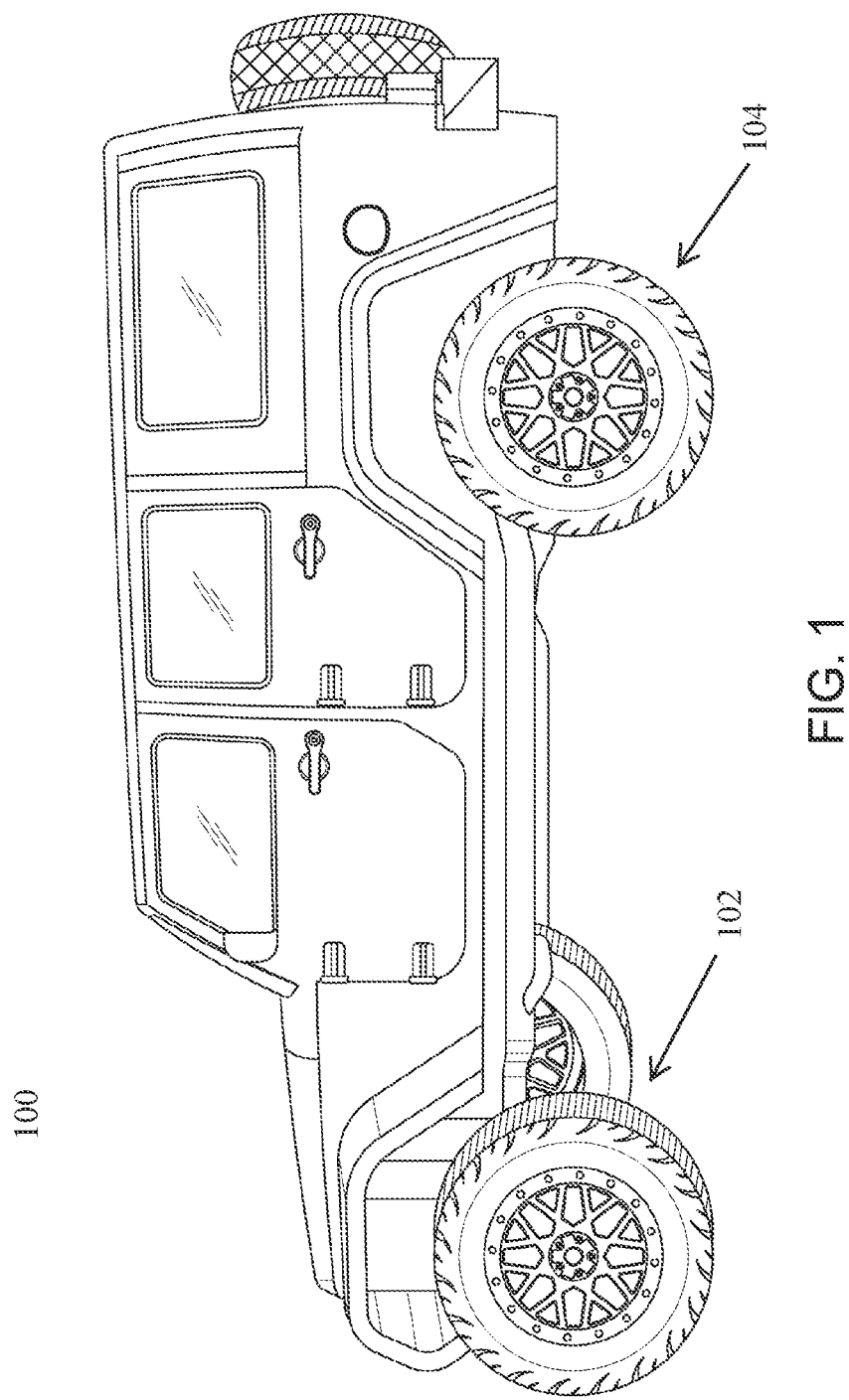
FIG. 1 is a diagram showing an example 4×4 vehicle prior to conversion to a 6×6 vehicle.

FIG. 1 is a diagram showing an example 4×4 vehicle 100 prior to conversion to a 6×6 vehicle. The vehicle has a first axle set 102 and a second axle set 104, where each axle set includes two axles that drive two corresponding wheels.

Figure 2:
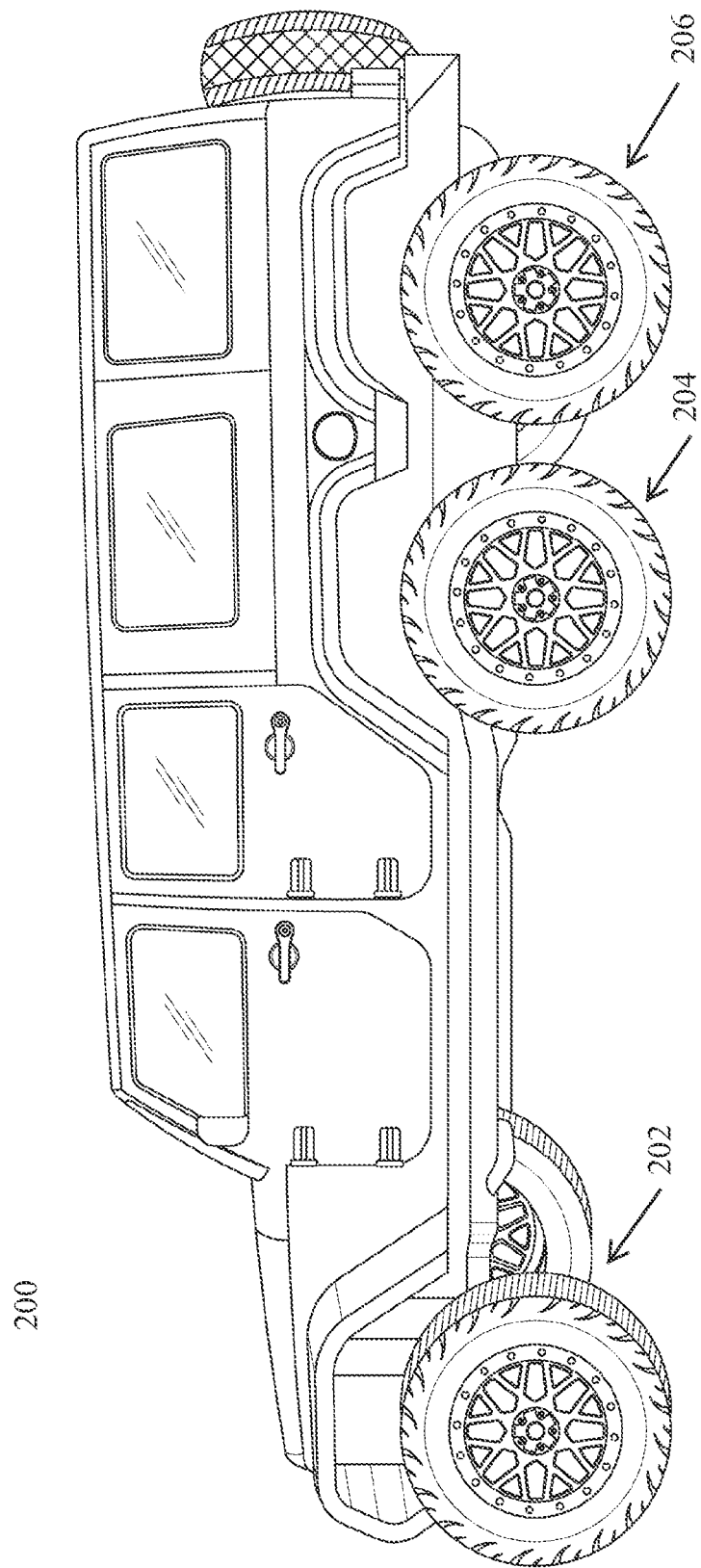
FIG. 2 is a diagram showing an example 6×6 vehicle post conversion.

FIG. 2 is a diagram showing an example 6×6 vehicle 200 that has been converted from a 4×4 vehicle (e.g., 100). The 6×6 vehicle 200 is a modified version of a 4×4 vehicle (e.g., similar to 100 shown in FIG. 1), where the modifications include, among other things, adding a front tandem axle 204 and keeping the original front axle 202 and rear axle 206.

Figure 3:
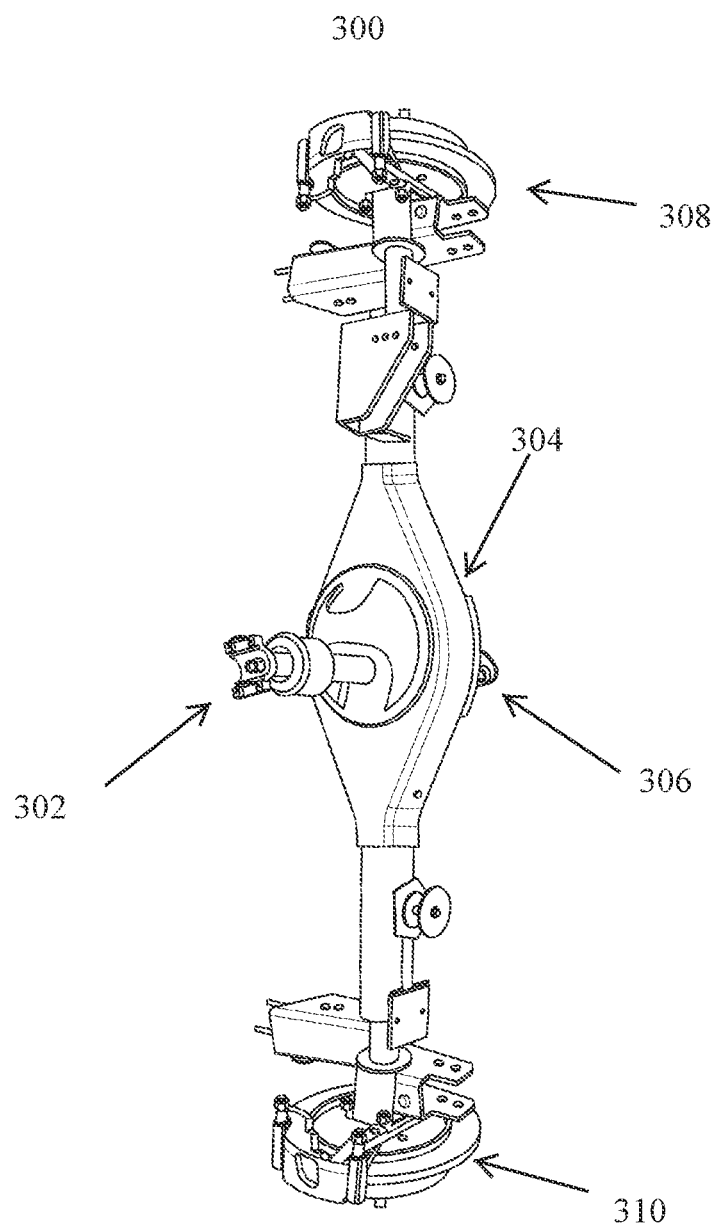
FIG. 3 is a diagram of an example front tandem axle in accordance with some implementations.

FIG. 3 is a diagram of an example front tandem axle 300 in accordance with some implementations. The front tandem axle 300 includes an input connection 302 that is coupled to the main drive shaft of a vehicle when the front tandem axle 300 is installed in a vehicle. The front tandem axle 300 also includes a differential 304 and an output connection 306 to transfer power from the drive shaft through the front tandem differential to a rear axle set on a vehicle. The front tandem axle 300 further includes a brake and hub assembly (308/310) for each end of the axle set 300.

Figure 4:
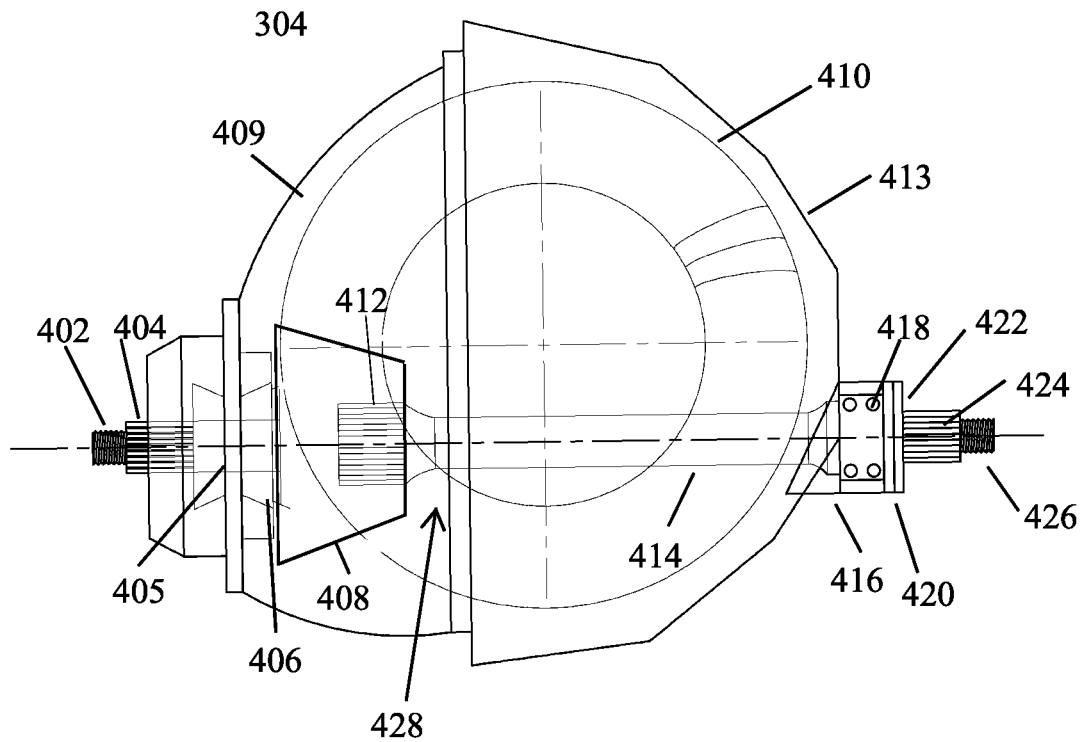
FIG. 4 is a diagram of an example differential of a front tandem axle for a 6×6 vehicle in accordance with some implementations.

FIG. 4 is a diagram of an example differential 304 of a front tandem axle for a 6×6 vehicle in accordance with some implementations. In particular, the differential 304 includes a threaded input connection 402 (or input yoke), an input shaft spline 404, input shaft 405, pinion bearings 406, a pinion 408, front housing 409, a ring gear 410, an output shaft spline 412, rear housing 413, an output shaft 414, an output boss 416, output bearing 418, snap ring 420, seal 422, output shaft spline 424, and a threaded output connection 426 (or output yoke).

Some conventional pass-through differentials include a stub bearing (disposed between the pinion and the output side in or near an area indicated by 428). Within a pass-through differential, the stub bearing may limit the strength of the differential by not permitting an increased pinion size and/or output shaft size. Further, the differential design including the stub bearing may require that the input shaft, pinion, and output shaft be in perfect or near perfect alignment, and thus the differential would be costly to manufacture, difficult to make correctly, and sensitive to any changes over time.

The present inventor has been able to solve strength problems or limitations with some conventional pass-through differentials by 1) eliminating the stub bearing, 2) increasing the output shaft size, and 3) increasing the size of the pinion bearings (e.g., by 300 percent) to compensate for the removal of the stub bearing. Further, in some implementations, the ball bearings in the output boss can include a double row ball bearing to provide additional support to the output shaft such that the larger pinion bearings and the double row ball bearing provide the necessary support for the input and output shafts of the differential with the stub bearing eliminated. For example, an implementation can include a pinion that is dead soft with a 1.3125-inch diameter/31-spline output shaft coupling for a 1.3125-inch output shaft diameter. A pinion with these dimensions would be difficult or impossible with the smaller shaft associated with the stub bearing models. In addition to providing increased splines, the larger output shaft also permits the nut connecting to the output shaft threaded connection to be increased from a ¾ inch 20-thread to a ⅞ inch 20-thread. In another example, an implementation can include a 35-spline pinion for a 1-ton configuration.

Figure 5:
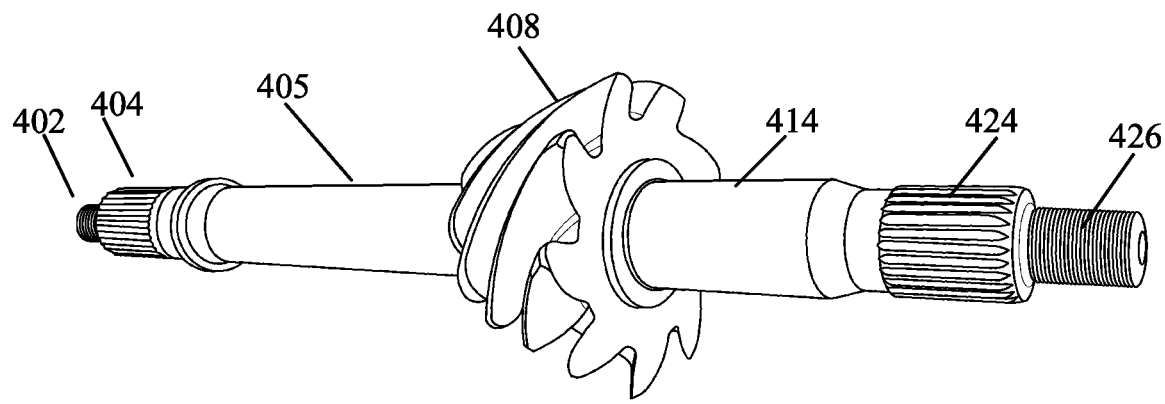
FIG. 5 is a diagram of an example front tandem axle shaft and pinion in an assembled state in accordance with some implementations.

FIG. 5 is a diagram of an example front tandem axle shaft 405 and 414 and pinion 408 in an assembled state in accordance with some implementations. FIG. 5 also shows the input threaded connection 402, input shaft splines 404, output splines 424 and output threaded connection 426.

Figure 6:
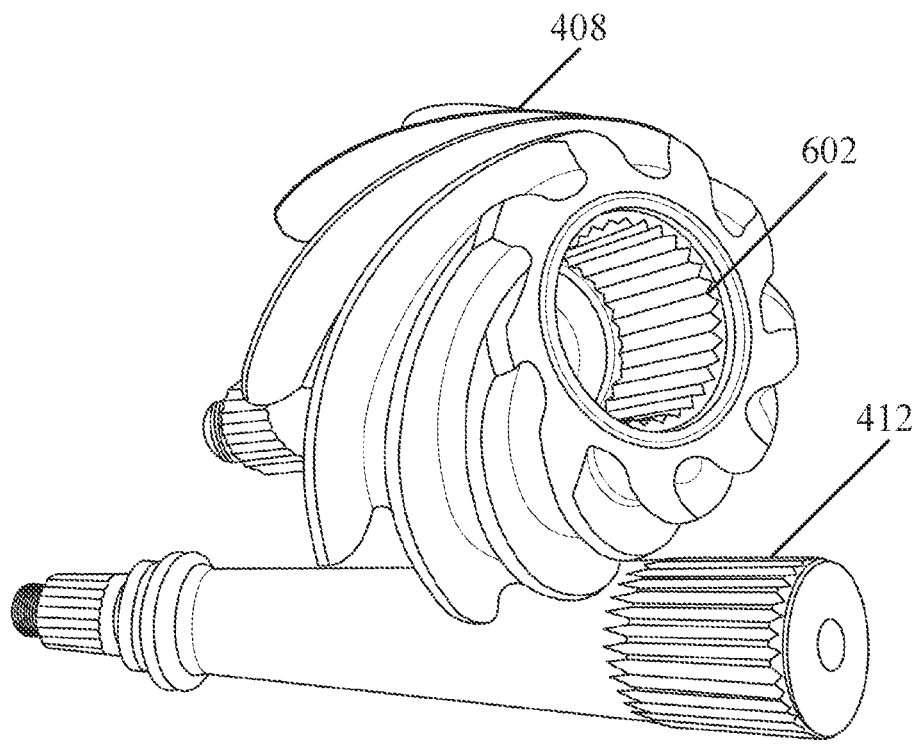
FIG. 6 is a diagram of an example front tandem axle differential in a dissembled state in accordance with some implementations.
Figure 7:
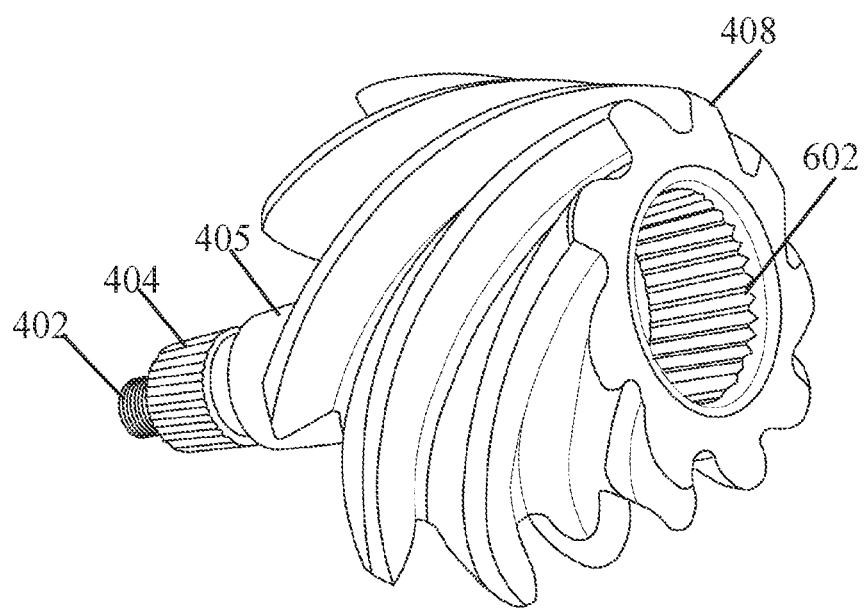
FIG. 7 is a diagram of an example pinion gear of a front tandem axle differential in accordance with some implementations.

FIGS. 6 and 7 are diagrams of an example front tandem axle differential in a dissembled state showing the pinion 408 with a pinion spline 602. The output shaft spline section 412 can include 28, 31, 32 splines or some other suitable number of splines. The pinion spline 602 includes a number of splines corresponding to the number on the output shaft spline section 412.

Figure 8:
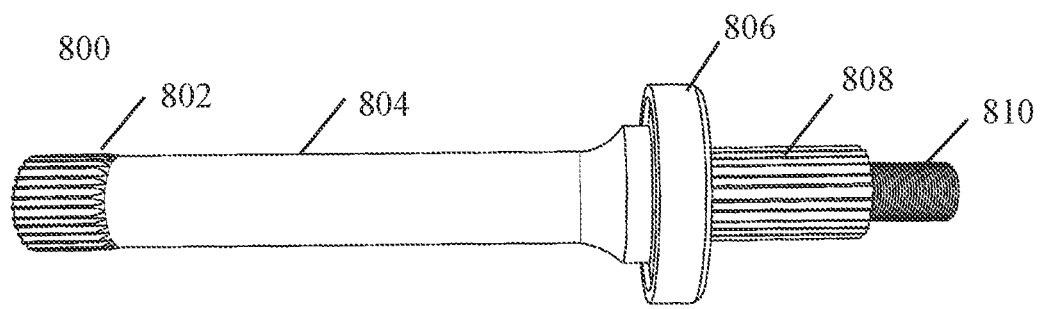
FIG. 8 is a diagram of an example front tandem differential output shaft and single race ball bearing in accordance with some implementations.

FIG. 8 is a diagram of an example front tandem differential output shaft and single race ball bearing 800 in accordance with some implementations. The shaft includes a pinion spline section 802, a shaft 804, a single row bearing 806, an output spline 808, and an output threaded connection 810. For example, the pinion spline section 802 can include 31 splines, the output spline section can include 28 splines, and the threaded connection 810 can include thread for a ¾ 20-thread nut.

Figure 9:
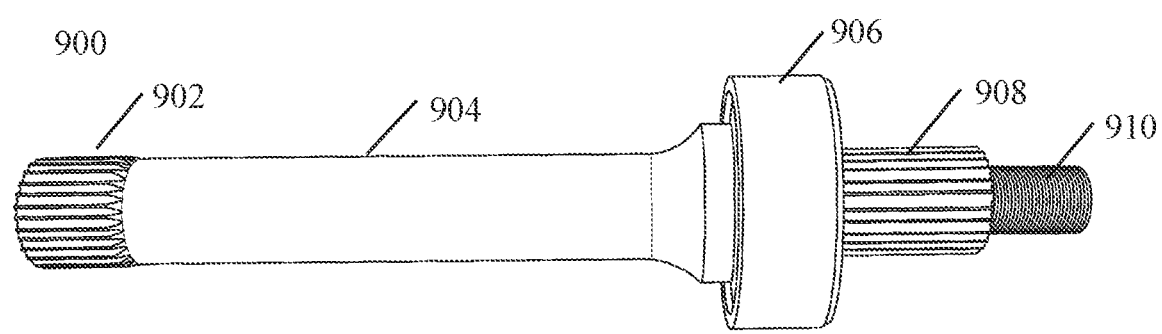
FIG. 9 is a diagram of an example front tandem differential output shaft and double race ball bearing in accordance with some implementations.

FIG. 9 is a diagram of an example front tandem differential output shaft and double race ball bearing 900 in accordance with some implementations. The shaft includes a pinion spline section 902, a shaft 904, a single row bearing 906, an output spline 908, and an output threaded connection 910. For example, the input spline section can include 35 splines, the pinion spline section 902 can include 32 splines, the output spline section can include 32 splines, and the threaded connection 910 can include thread for a ⅞ 20-thread nut.

Figure 10:
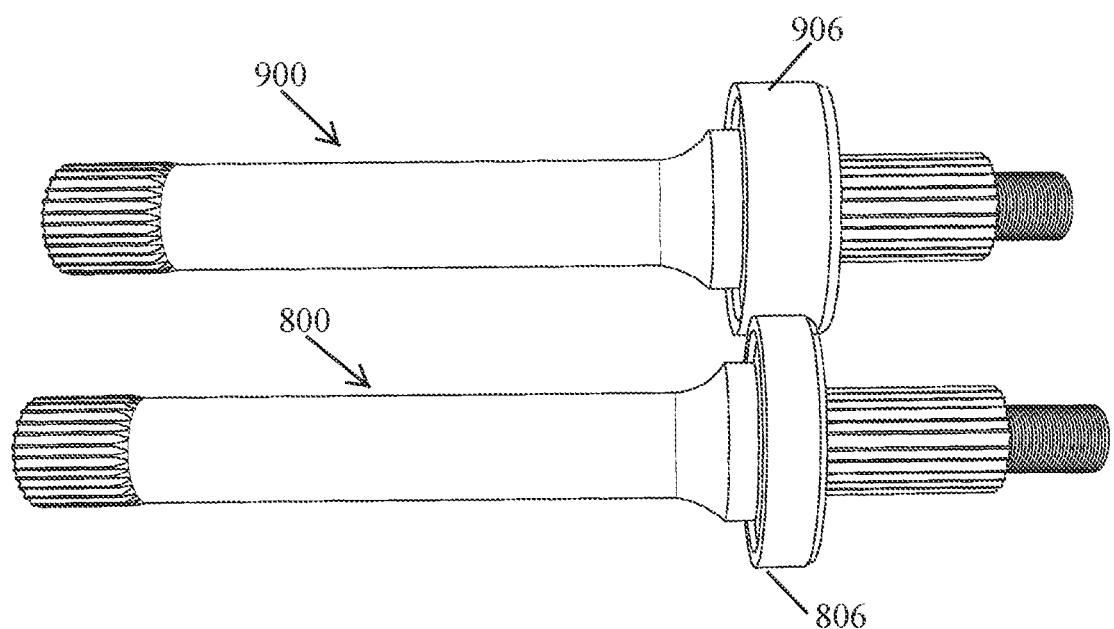
FIG. 10 is a diagram of an example front tandem differential output shaft with single race ball bearing and an example front tandem differential output shaft with double race ball bearing in accordance with some implementations.

FIG. 10 is a diagram of an example front tandem differential output shaft with single race ball bearing 800 and an example front tandem differential output shaft with double race ball bearing 900 in accordance with some implementations.

Figure 11:
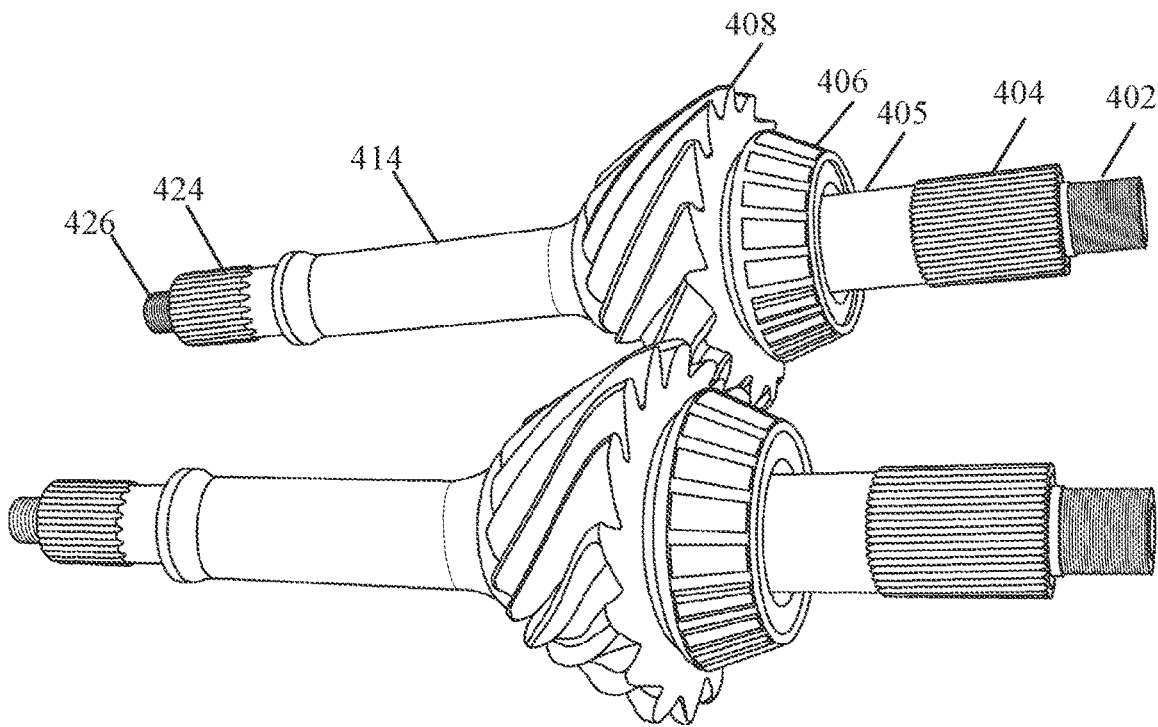
FIG. 11 is a diagram showing example front tandem differential multi-part shafts, pinions and pinion bearings in accordance with some implementations.

FIG. 11 is a diagram showing example front tandem differential multi-part shafts, pinions and pinion bearings in accordance with some implementations. In particular, FIG. 11 shows a two-piece shaft 414/405, a pinion 408, and a pinion bearing 406.

Figure 12:
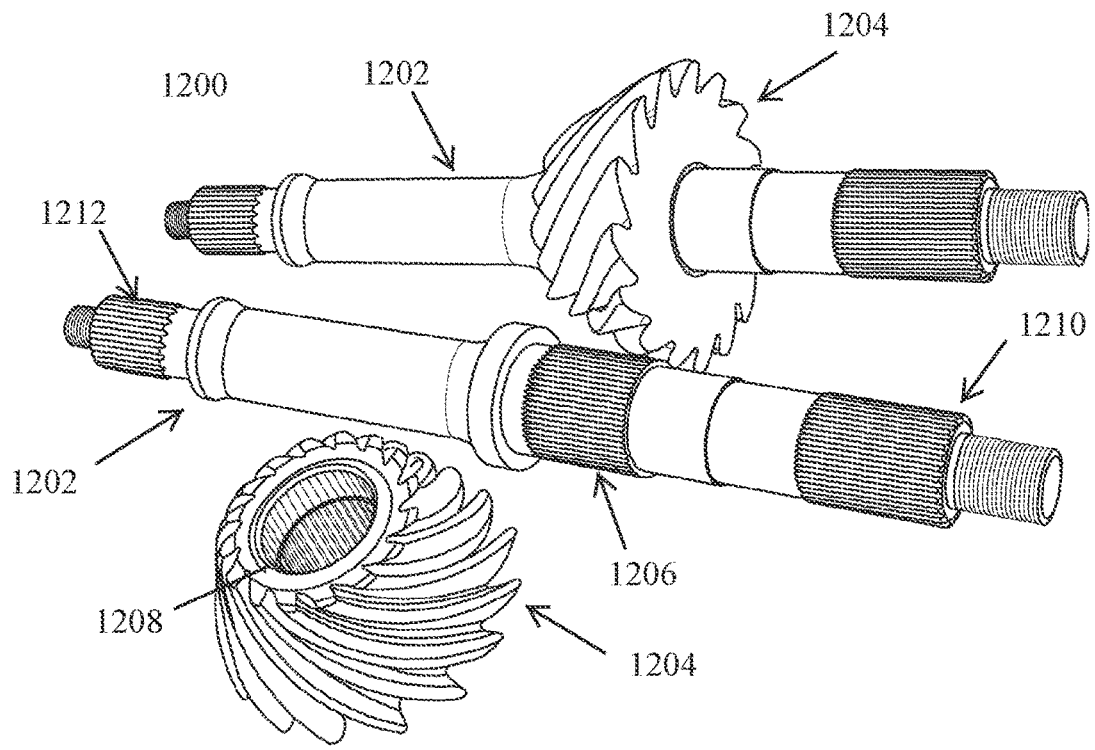
FIG. 12 is a diagram showing example front tandem differential single-piece shafts and pinions in accordance with some implementations.

FIG. 12 is a diagram showing example front tandem differential single-piece shafts and pinions in accordance with some implementations. In particular, FIG. 12 shows a single piece shaft 1202 that is configured with three spline sections: an input spline section 1210, and output spline section 1212, and a pinion spline section 1206 configured to couple to the spline section 1208 of the pinion gear 1204. In some implementations, a differential could include the single piece shaft 1202, pinion 1204, and a double row ball bearing on the output shaft (e.g., similar to 418 or 906). In some implementations, the single piece shaft can include an input spline section with 35 splines, a pinion spline section with 32 splines and an output spline section with 32 splines.

Figure 13:
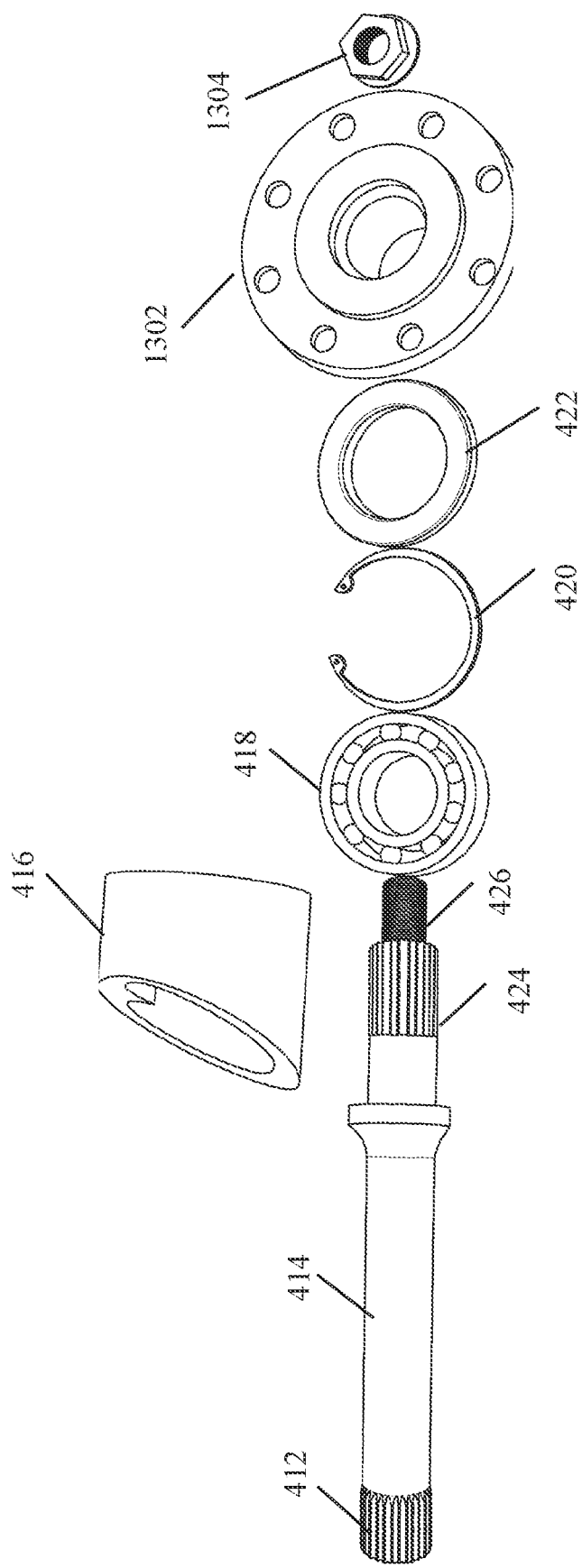
FIG. 13 is a diagram showing an exploded view of an example front tandem differential output shaft and associated components in accordance with some implementations.

FIG. 13 is a diagram showing an exploded view of an example front tandem differential output shaft and associated components in accordance with some implementations. In particular, FIG. 13 shows an output shaft 414, a pinion spline section 412, an output spline section 424, and an output threaded connection 426 (or output yoke). The output side of the differential also includes an output boss 416, an output shaft ball bearing 418 (e.g., a single row or double row), a snap ring 420 (to hold the ball bearing in place), a seal 422, flange 1302, and a nut 1304.

Figure 14:
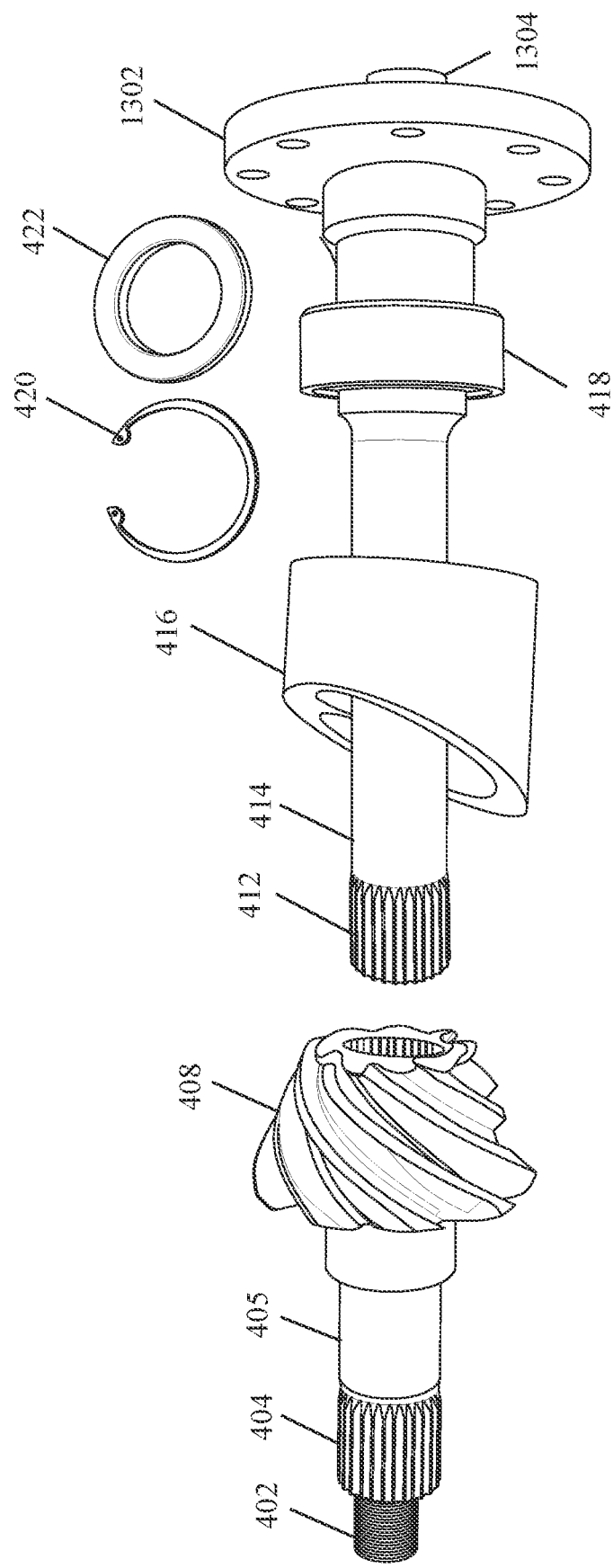
FIG. 14 is a diagram showing a partially assembled example front tandem differential output shaft, pinion, and associated components in accordance with some implementations.

FIG. 14 is a diagram showing a partially assembled example front tandem differential input shaft, output shaft, pinion, and associated components in accordance with some implementations. In particular, FIG. 14 shows an input shaft 405 having an input thread connection 402 (or input yoke), an input spline section 404, and a pinion 408. FIG. 14 also shows an output shaft 414 with a pinion spline section 412, an output boss 416, a bearing 418 (e.g., a double row ball bearing), a snap ring 420, a seal 422, a flange 1302, and a nut 1304.

Figure 15:
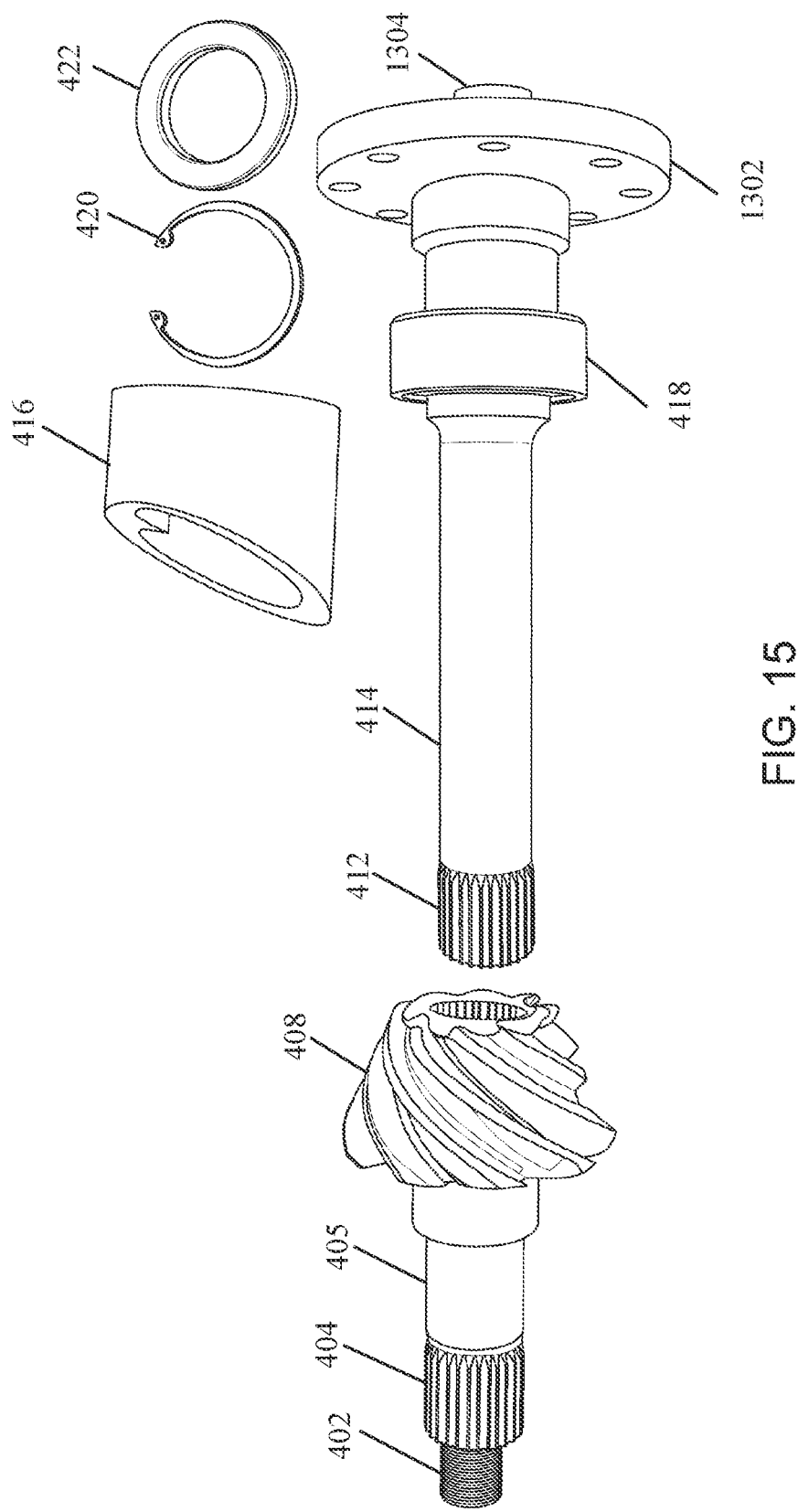
FIG. 15 is a diagram showing a partially assembled example front tandem differential output shaft, pinion, and associated components in accordance with some implementations.

FIG. 15 is a diagram showing a partially assembled example front tandem differential output shaft, pinion, and associated components in accordance with some implementations. In particular, FIG. 15 shows an input shaft 405 having an input thread connection 402 (or input yoke), an input spline section 404, and a pinion 408. FIG. 15 also shows an output shaft 414 with a pinion spline section 412, an output boss 416, a bearing 418 (e.g., a double row ball bearing), a snap ring 420, a seal 422, a flange 1302, and a nut 1304.

Figure 16:
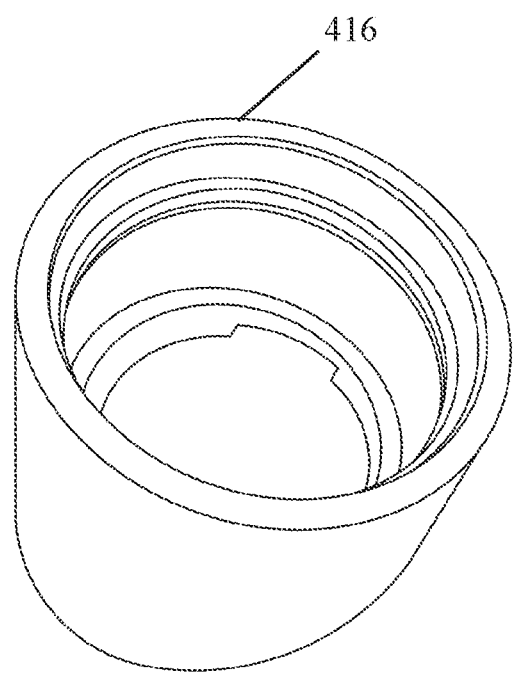
FIG. 16 is a diagram of an example output boss in accordance with some implementations.

FIG. 16 is a diagram of an example output boss 416 in accordance with some implementations.

Figure 17:
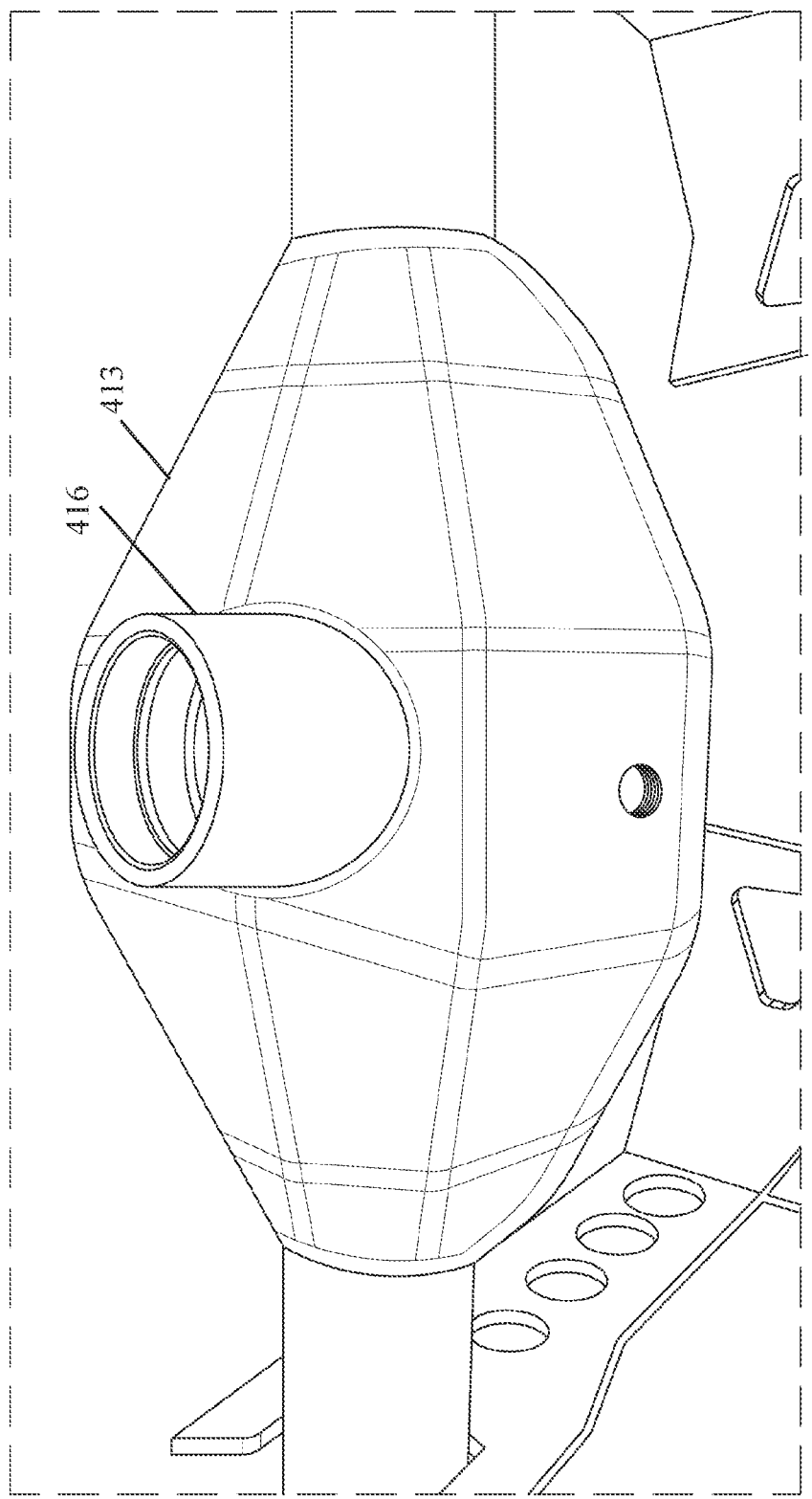
FIG. 17 is a diagram of the outside of the rear housing of an example front tandem differential in accordance with some implementations.

FIG. 17 is a diagram of the outside of the rear housing 413 of an example front tandem differential and the output boss 416.

Figure 18:
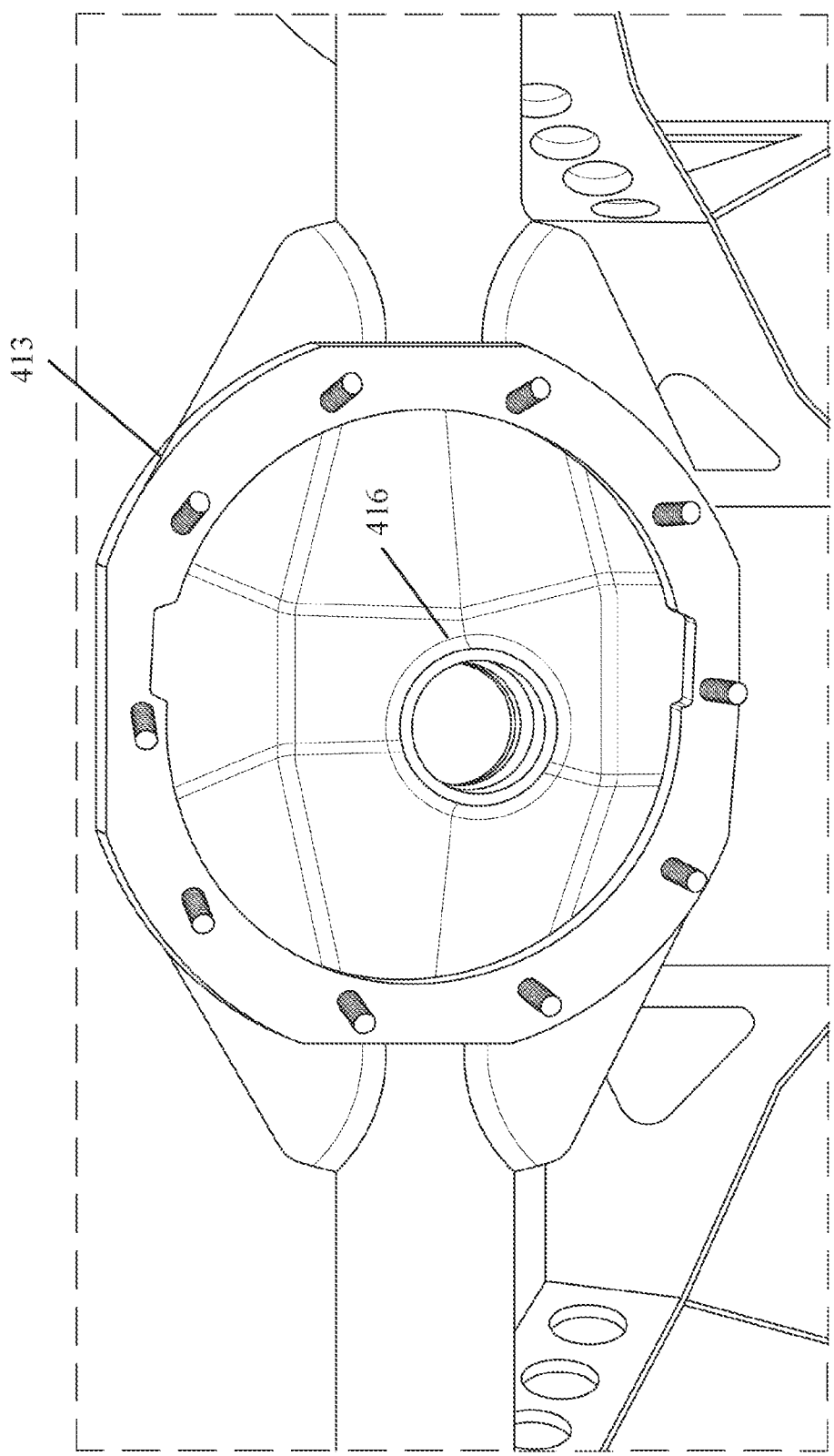
FIG. 18 is a diagram of the inside of the rear housing of an example front tandem differential in accordance with some implementations.

FIG. 18 is a diagram of the inside of the rear housing 413 of an example front tandem differential and the output boss 416.

In some implementations, the output boss (e.g., 416) is welded to the housing on both the inside and outside of the housing.

Figure 19:
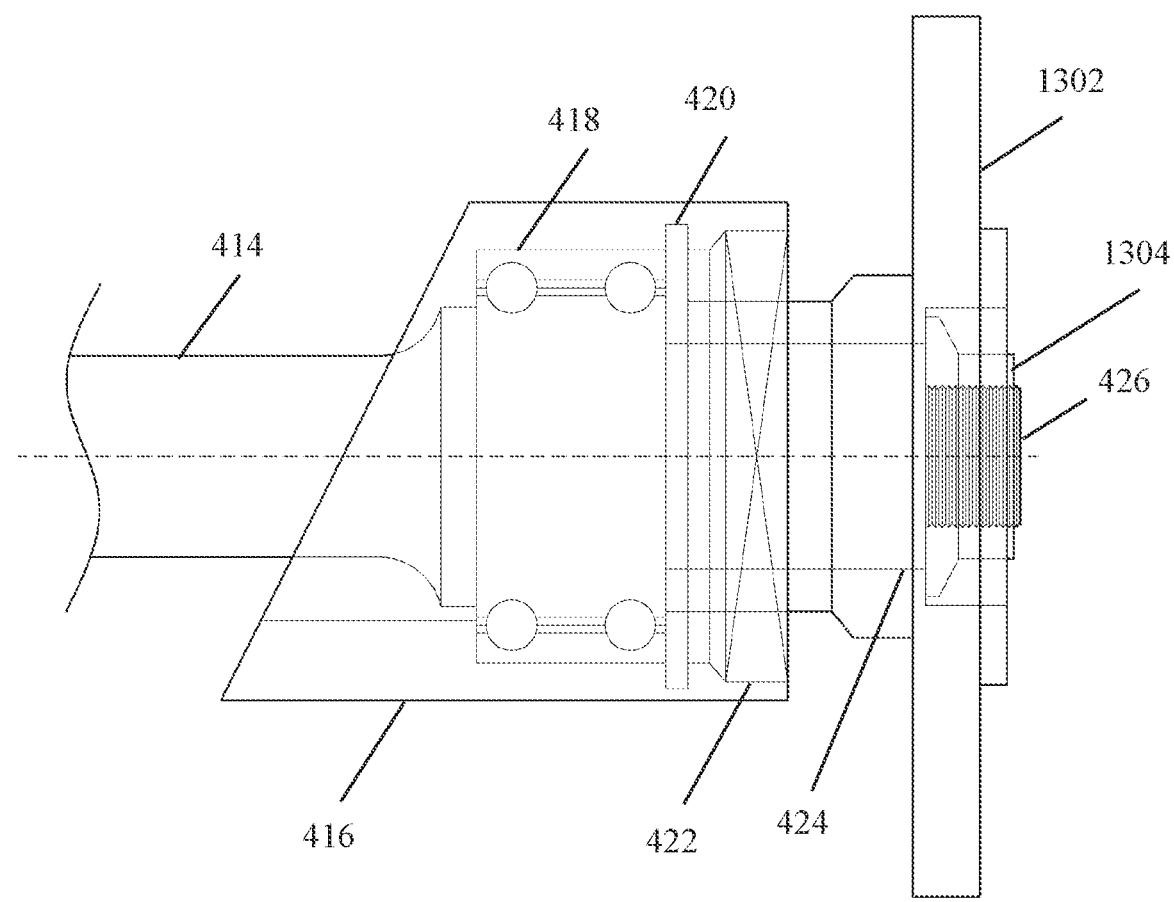
FIG. 19 is a diagram showing details of an example output side of a front tandem differential in accordance with some implementations.

FIG. 19 is a diagram showing details of an example output side of a front tandem differential in accordance with some implementations. In particular, FIG. 19 shows an output shaft 414, an output boss 416, a double row ball bearing 418, a snap ring 420, a seal 422, and an output shaft spline section 424 (e.g., a 32 spline). The double row ball bearing 418 can include an inner race 1902 and an outer race 1904. FIG. 19 also shows a flange 1302 and a nut 1304.

In some implementations, the input spline section can include 28 splines, the pinion spline section can include 31 splines, and the output spline section can include 28 splines. The number of pinion splines may be greater because the internal area of the pinion may not be hardened (e.g., may be dead soft) where the outer layer of the pinion is hardened (e.g., case hardened) and thus additional splines may be needed on the pinion splines to support torque. In other implementations, a spline configuration of 35-32-32 for input, pinion, and output respectively can be used. In some implementations, the input shaft can be formed from 8620 steel and the output shaft can be formed from 4340 steel.

While some example implementations have been described in terms of a general embodiment with several specific example modifications, it is recognized that other modifications and variations of the embodiments described above are within the spirit and scope of the disclosed subject matter. Applicant intends to embrace any and all such modifications, variations and embodiments.

What is claimed is:

1. A differential comprising:
   an input shaft having an input spline section and a threaded input connection;
   a pinion coupled to the input shaft, the pinion having a splined recess;
   one or more pinion bearings disposed on the input shaft and configured to support the input shaft and the pinion;
   an output shaft having a pinion spline section configured to mate with the splined recess of the pinion, the output shaft having an output spline section and a threaded output connection;
   an output boss having an aperture through which the output shaft extends through;

an output bearing disposed around the output shaft and within the output boss, wherein the output bearing is a single-piece double row bearing;
a snap ring configured to fit over the output shaft to hold the output bearing in place;
a seal configured to seal an outermost opening of the output boss;
a flange; and
a nut to couple the flange to the output shaft,
wherein the input shaft and the output shaft are supported only by the pinion bearing and the output bearing.

2. The differential of claim 1, wherein the input spline section includes 28 splines, the pinion spline section includes 32 splines, and the output spline section includes 28 splines.

3. The differential of claim 1, wherein the input spline section includes 32 splines, and the output spline section includes 32 splines.

4. The differential of claim 1, wherein the input spline section includes 35 splines, and the output spline section includes 32 splines.

5. A differential comprising:
an input shaft having an input spline section and a threaded input connection;
a pinion coupled to the input shaft, the pinion having a splined recess;
one or more pinion bearings disposed on the input shaft and configured to support the input shaft and the pinion;
an output shaft having a pinion spline section configured to mate with the splined recess of the pinion, the output shaft having an output spline section and a threaded output connection, wherein the pinion spline section includes 32 splines, and the output spline section includes 32 splines;
an output boss having an aperture through which the output shaft extends through;
an output bearing disposed around the output shaft and within the output boss, wherein the output bearing is a single-piece double row bearing;
a snap ring configured to fit over the output shaft to hold the output bearing in place;
a seal configured to seal an outermost opening of the output boss;
a flange; and
a nut to couple the flange to the output shaft,
wherein the input shaft and the output shaft are supported only by the pinion bearing and the output bearing.

6. A differential comprising:
a single shaft having an input spline section, a threaded input connection, a pinion spline section, an output spline section, and an output threaded connection;
a pinion having an aperture with splines formed on an interior of the aperture, wherein the pinion is configured to slide onto the single shaft and engage the pinion spline section with the aperture with interior splines;
one or more pinion bearings disposed on the single shaft and configured to support the single shaft and the pinion;
an output boss having an aperture through which the single shaft extends through;
an output bearing disposed around the single shaft and within the output boss, wherein the output bearing is a single-piece double row bearing;
a snap ring configured to fit over the single shaft to hold the output bearing in place;
a seal configured to seal an outermost opening of the output boss;
a flange; and
a nut to couple the flange to the single shaft,
wherein the single shaft is supported only by the pinion bearing and the output bearing.

7. The differential of claim 6, wherein the input spline section includes 28 splines, and the output spline section includes 31 splines.

8. The differential of claim 6, wherein the input spline section includes 32 splines, and the output spline section includes 32 splines.

9. The differential of claim 6, wherein the input spline section includes 35 splines, and the output spline section includes 32 splines.

* * * * *